(12) United States Patent
Jewess

(10) Patent No.: US 9,605,592 B2
(45) Date of Patent: Mar. 28, 2017

(54) LUBE TUBE EXPANSION AND TORQUE RETAINING DEVICE

(71) Applicant: United Technologies Corporation, Hartford, CT (US)

(72) Inventor: Gordon F. Jewess, San Diego, CA (US)

(73) Assignee: United Technologies Corporation, Hartford, CT (US)

( * ) Notice: Subject to any disclaimer, the term of this patent is extended or adjusted under 35 U.S.C. 154(b) by 387 days.

(21) Appl. No.: 14/210,939

(22) Filed: Mar. 14, 2014

(65) Prior Publication Data
US 2014/0260176 A1    Sep. 18, 2014

Related U.S. Application Data

(60) Provisional application No. 61/789,793, filed on Mar. 15, 2013.

(51) Int. Cl.
*F01D 25/18* (2006.01)
*F02C 7/06* (2006.01)

(52) U.S. Cl.
CPC ........... *F02C 7/06* (2013.01); *F01D 25/18* (2013.01); *F05D 2220/50* (2013.01); *F05D 2230/60* (2013.01); *F05D 2240/50* (2013.01); *Y10T 29/49229* (2015.01)

(58) Field of Classification Search
CPC .... F01D 25/18; F02C 7/14; F02C 7/06; F16N 2210/02; F16B 39/10
USPC .... 248/674, 523, 200, 292.12; 411/120, 119
See application file for complete search history.

(56) References Cited

U.S. PATENT DOCUMENTS

| 4,534,101 A * | 8/1985 | Rosan, Jr. | F16B 39/10 29/258 |
| 2010/0275572 A1* | 11/2010 | Durocher | F01D 9/065 60/39.08 |

\* cited by examiner

*Primary Examiner* — Christopher Besler
(74) *Attorney, Agent, or Firm* — Kinney & Lange, P.A.

(57) ABSTRACT

A bearing lubrication tube for an APU is mounted on a bearing to permit expansion and contraction of the tube along its length while preventing rotational movement of the tube. The bearing lubrication tube is held by a bracket attached to a flange outside the engine. The bracket includes a double hex ring with the outer hex ring engaging the bracket and an inner hex ring engaging the tube to prevent rotation of the tube. A cover on the bracket maintains the double hex ring in position.

17 Claims, 2 Drawing Sheets

LUBE TUBE EXPANSION AND TORQUE RETAINING DEVICE

CROSS-REFERENCE TO RELATED APPLICATION(S)

This application claims priority to U.S. provisional patent application U.S. 61/789,793, filed Mar. 15, 2013, which is hereby incorporated by reference in its entirety.

BACKGROUND

On auxiliary power units (APUs) with aft bearings, there is a requirement to pass lubrication into the bearing, scavenge the lubrication out, and vent the bearing compartment. This is conventionally done using tubes that are attached to the bearing housing and pass through the exhaust duct to the exterior of the APU engine where the tubes can be connected to further tubes, pumps and the like.

A particular design of tubes for lubricating APU bearings utilizes a threaded end fitting that is screwed into the bearing compartment and is fitted with a sheet metal seal. Problems arise in this design because the tubes need to be locked into place, torque wise, so they do not become unthreaded and thus no longer attached to the bearing. At the same time, there must be a way to permit relative expansion between the relatively cool tubes and the very hot exhaust duct, of perhaps 1200° F. (649° C.) to 1600° F. (871° C.). In addition, vibration of the tubes needs to be dampened to prevent tube damage.

SUMMARY

The present invention is a bracket that mounts the lubrication tubes to prevent torque movement of the tube after installation, thus preventing the tube from being unscrewed from the bearing compartment. A double hex ring is used to prevent such axial rotation while permitting expansion and contraction of the tube along its length. The bracket mounts to an outer portion of the exhaust duct.

DETAILED DESCRIPTION

Figure 1:
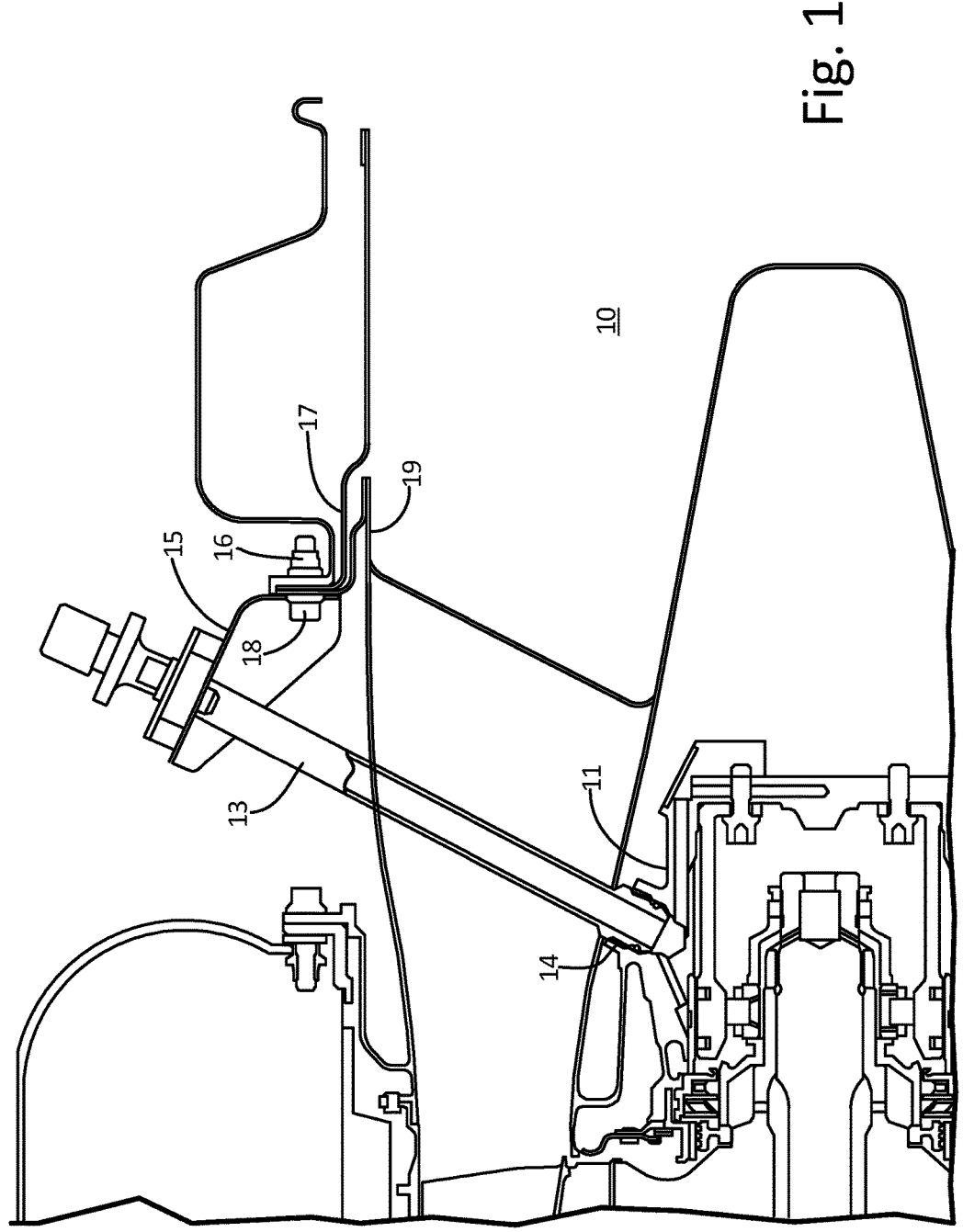
FIG. 1 is a side view in section of the after bearing engine housing.

FIG. 1 is a sectional view of an aft portion of auxiliary power unit (APU) that shows the location in APU engine 10 of bearing housing 11. One such housing 11 is shown with bearing lubrication tube 13. In practice a plurality of tubes are used to pass lubrication into a bearing, scavenge the lubrication out and vent the bearing compartment. It is contemplated that all such tubes in actual use will include the present invention.

The end of bearing lubrication tube 13 that engages bearing housing 11 includes threads 14 that permit tube 13 to be threaded into housing 11 at a predetermined torque to keep tube 13 in housing 11. What needs to be prevented in order to maintain this mounting is any rotational torque movement of tube 13 once it is in place in housing 11.

Bracket 15 is mounted on the other end of tube 13. Bracket 15 is mounted on flange 17 using nut 16 and bolt 18. Flange 17 in turn is attached to exhaust duct 19 of engine 10. Bracket 15 includes a double hex ring 21 shown best in FIG. 4, such that the outer hex ring 23 engages bracket 15 and the inner hex ring 24 engages tube 13. Tube 13 has a hex engaging outer surface 25, shown in FIG. 3. Double hex ring 21 is held in bracket 15 by cover 27, in FIG. 3, which is removeably mounted on bracket 15 after double hex ring 21 is positioned to engage tube 13 and bracket 21. When tube 13 is held in double hex ring 21, rotation or torque of tube 13 is not permitted because double hex ring 21 also engages bracket 15. In effect, double hex ring 21 engages tube 13 at outer surface 25 and engages bracket 15 inside cover 27. By tightening bolts 37 in holes 35, there is sufficient pressure on double hex ring 21 to prevent rotation of double hex ring 21. Bracket 15 and/or cover 27 also can be fitted with a hex ring to engage outer hex ring 23. When tube 13 is subjected to heat or cooling, such as when a relatively cool tube is contacted by very hot exhaust gas in exhaust duct 19, or example, relative expansion is freely permitted.

Figure 2:
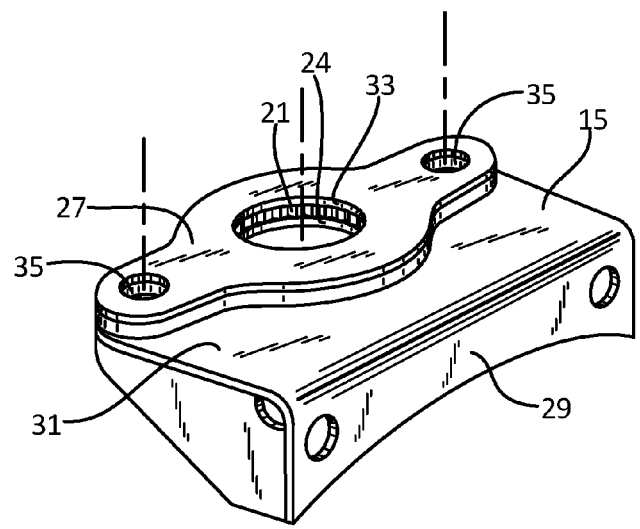
FIG. 2 is an isometric view of the bracket shown in FIG. 1.

FIG. 2 shows bracket 15, without a tube for clarity, such that bracket 15 has a flange engaging surface 29 and a flat, tube engaging surface 31 with a center hole 33. Double hex ring 21 is placed in center hole 33 such that it's outer hex ring 23 engages bracket 15. The inner hex ring 24 is visible in FIG. 2, and will engage hex engaging outer surface 25 on tube 13 when tube 13 is engaged with bracket 15.

Figure 3:
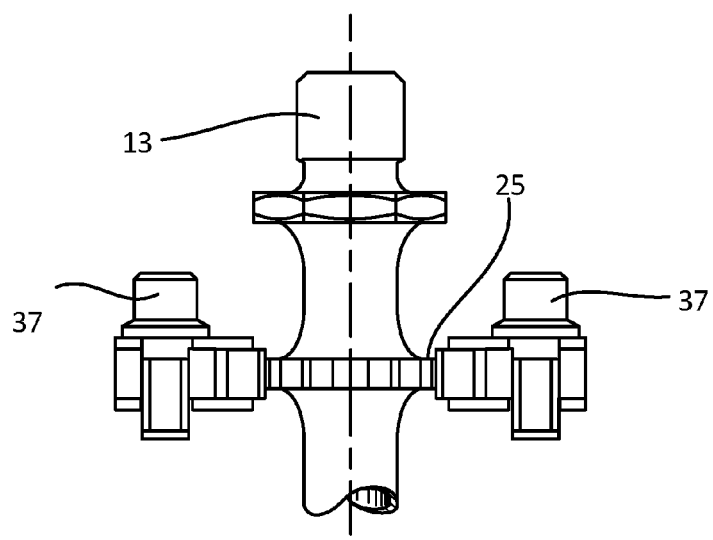
FIG. 3 is a partial section view of the bracket and lubrication tube, showing the location of a double hex ring.
Figure 4:
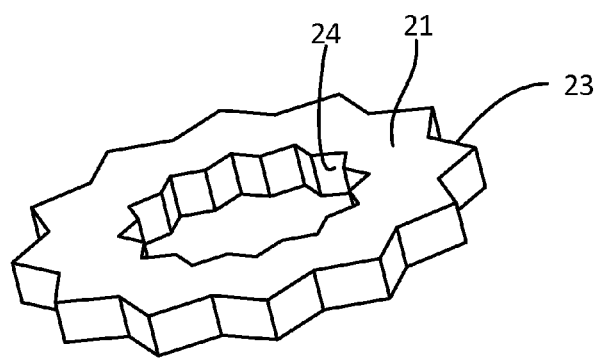
FIG. 4 is an isometric view of the double hex ring

Cover 27 is removeably attached to bracket 15 using a bolt in cover holes 35, with bolts 37 as seen in FIG. 3. Tube 13's hex engaging surface 25 is also better seen in FIG. 3. Double hex ring 21 is shown in FIG. 4, and is inserted in bracket 15 to engage surface 25.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

DISCUSSION OF POSSIBLE EMBODIMENTS

The following are nonexclusive descriptions of possible embodiments of the present invention.

A bracket for stabilizing bearing lubrication tubes that are torqued into a bearing housing has a central opening for locating the bearing tube. A double hex ring having an inner ring and an outer ring is placed in the bracket such that the inner ring engages the bearing tube and the outer ring engages the bracket to prevent torque rotation. A cover mounts the double hex ring in place.

The bracket of the preceding paragraph can optionally include additionally and/or alternatively, any one or more of the following features, configurations and/or additional components.

The bracket can be fixedly mounted to the outside of an APU engine.

The bracket can be fixedly mounted to a flange on the outside of the engine.

The flange can be fixedly mounted on an exhaust duct of the engine.

The bearing lubrication tube can have a hex ring sized and positioned to engage the inner hex ring.

A system of mounting a bearing lubrication tube on a bearing includes a bearing lubrication tube positioned on a bearing housing at a predetermined torque load. A bracket supports the bearing lubrication tube while permitting expansion and contraction along the length of the tube. A double hex ring having an inner hex ring and an outer hex ring is mounted in the bracket such that the inner ring engages the lubrication tube and the outer ring engages the bracket to prevent torque movement of the tube. The system includes a cover on the bracket to maintain the double hex ring in position.

The system of the preceding paragraph can optionally include additionally and/or alternatively, any one or more of the following features, configurations and/or additional components.

The bracket can be fixedly mounted to the outside of an APU engine.

The bracket can be fixedly mounted to a flange on the outside of the engine.

The flange can be fixedly mounted on an exhaust duct of the engine.

The bearing lubrication tube can have a hex ring sized and positioned to engage the inner hex ring.

A method of mounting a bearing lubrication tube on a bearing permits expansion and contraction of the tube along its length while preventing torque movement of the tube. The method includes threading the bearing lubrication tube on a bearing to a predetermined torque load. A bracket is slid on the bearing lubrication tube and a double hex ring is mounted in the bracket. The double hex ring is aligned in torque preventing engagement with the bracket and the tube. A cover secures the double hex ring on the bracket.

The method of the preceding paragraph can optionally include additionally and/or alternatively, any one or more of the following features, configurations and/or additional components.

The bracket can be fixedly mounted to the outside of an APU engine.

The bracket can be fixedly mounted to a flange on the outside of the engine.

The flange can be fixedly mounted on an exhaust duct of the engine.

The bearing lubrication tube can have a hex ring sized and positioned to engage the inner hex ring.

The invention claimed is:

1. A bracket assembly for stabilizing a bearing lubrication tube in a gas turbine engine having an exhaust member, the bearing lubrication tube having a threaded end for attaching the threaded end into a bearing housing and an outer end having a hex ring formed on the outside of the outer end for positioning radially outside the bearing housing, the bracket assembly comprising:
   a bracket having a central opening for locating a bearing lubrication tube proximate its outer end, the bracket being mounted on an exhaust member of a gas turbine engine;
   a double hex ring having a hex-shaped inner surface and a hex-shaped outer surface, positioned in the central opening of the bracket, the outer surface positioned to engage the central opening of the bracket and the inner surface positioned to engage the bearing lubrication tube to prevent rotation of the bearing lubrication tube about its axis; and
   a cover positioned on the bracket for mounting the double hex ring in position to engage the bearing lubrication tube and the central opening of the bracket.

2. The bracket assembly of claim 1, wherein the bracket is fixedly mounted to an exhaust duct on an outside of an auxiliary power unit.

3. The bracket assembly of claim 2, wherein the bracket is fixedly attached to a flange on the outside of the auxiliary power unit.

4. The bracket assembly of claim 3, wherein the flange is fixedly mounted on an exhaust duct on the engine.

5. The bracket assembly of claim 1, wherein the bearing lubrication tube hex ring is sized and positioned to engage the inner surface.

6. The bracket assembly of claim 1, wherein the cover is removeably mounted on the bracket.

7. A system of mounting a bearing lubrication tube on a bearing, the system comprising:
   a bearing lubrication tube positioned on a bearing to a predetermined torque load;
   a bracket having a central opening for locating the bearing lubrication tube proximate its outer end, the bracket being mounted on an exhaust member of a gas turbine engine;
   a double hex ring having a hex-shaped inner surface and a hex-shaped outer surface positioned in the central opening of the bracket, the outer surface positioned to engage the central opening of the bracket and the inner surface positioned to engage the bearing lubrication tube to prevent rotation of the bearing lubrication tube about its axis; and
   a cover positioned on the bracket for mounting the double hex ring in position to engage the bearing lubrication tube and the central opening of the bracket.

8. The system of claim 2, wherein the bracket is fixedly attached to a flange on an outside of the auxiliary power unit.

9. The system of claim 8, wherein the flange is fixedly mounted on an exhaust duct on the outside of the auxiliary power unit.

10. The system of claim 7, wherein the bearing lubrication tube includes a hex ring sized and positioned to engage the inner surface.

11. The system of claim 7, wherein the cover is removeably mounted on the bracket.

12. A method of mounting a bearing lubrication tube on a bearing having a threaded end for engaging a bearing and an outer end having a hex ring formed on the outside of the outer end for positioning radially outside the bearing housing to permit expansion and contraction of the tube along its length while preventing torque movement of the tube, the method comprising:
   threading the bearing lubrication tube on a bearing;
   sliding a bracket on to the outer end of the bearing lubrication tube, the bracket having a central opening for locating the bearing lubrication tube proximate its outer end, and the bracket being mounted on an exhaust member of a gas turbine engine;
   aligning a double hex ring in engagement with the bearing lubrication tube, the double hex ring having a hex-shaped inner surface and a hex-shaped outer surface, positioned in the central opening of the bracket, the outer surface positioned to engage the central opening of the bracket and the inner surface positioned to engage the bearing lubrication tube to prevent rotation of the bearing lubrication tube about its axis;
   aligning the double hex ring in engagement with the bracket, and mounting a cover on the bracket to maintain the double hex ring in position to engage the bearing lubrication tube and the central opening of the bracket.

13. The method of claim 12, wherein the bracket is fixedly mounted to an outside of an auxiliary power unit.

14. The method of claim 13, wherein the bracket is fixedly attached to a flange on the outside of the auxiliary power unit.

15. The method of claim 14, wherein the flange is fixedly mounted on an exhaust duct on the engine.

16. The method of claim 12, wherein the bearing lubrication tube includes a hex ring sized and positioned to engage the inner surface.

17. The method of claim 12, wherein the cover is removeably mounted on the bracket.

* * * * *